US010882567B2

(12) United States Patent
Schulz et al.

(10) Patent No.: US 10,882,567 B2
(45) Date of Patent: Jan. 5, 2021

(54) RAIL SYSTEM FOR A CABIN OF A VEHICLE

(71) Applicant: Airbus Operations GmbH, Hamburg (DE)

(72) Inventors: Alexander Schulz, Hamburg (DE); Lars Schomacker, Hamburg (DE); Malte Fuerstenberg, Hamburg (DE); Sergej Schwenk, Hamburg (DE); Rainer Ristow, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 105 days.

(21) Appl. No.: 16/377,732

(22) Filed: Apr. 8, 2019

(65) Prior Publication Data

US 2019/0308670 A1 Oct. 10, 2019

(30) Foreign Application Priority Data

Apr. 9, 2018 (DE) ........................ 10 2018 108 304

(51) Int. Cl.
*B60J 7/00* (2006.01)
*B62D 25/20* (2006.01)
(Continued)

(52) U.S. Cl.
CPC ........... *B62D 25/2018* (2013.01); *B60N 2/07* (2013.01); *B62D 27/02* (2013.01); *B60N 2/01516* (2013.01)

(58) Field of Classification Search
CPC ... B60J 7/024; B60J 7/102; B60J 7/053; B60J 7/104; B60P 7/04; B60P 3/00; B60R 13/01; B60R 22/06; B65H 2511/12; B25H 3/06
See application file for complete search history.

(56) References Cited

U.S. PATENT DOCUMENTS 3,806,672 A * 4/1974 Landis ..................... B60M 1/04
191/30
3,927,742 A * 12/1975 Reynolds ................. B60M 1/04
191/30
(Continued)

FOREIGN PATENT DOCUMENTS

CN 103596802 A 2/2014
CN 104185569 A 12/2014
(Continued)

OTHER PUBLICATIONS

German Search Report; priority document.

*Primary Examiner* — Kiran B Patel
(74) *Attorney, Agent, or Firm* — Greer, Burns & Crain, Ltd.

(57) ABSTRACT

A rail system for a cabin of the vehicle comprises a rail with a main extension direction, a fixing element which can be fixed at various positions of the rail to hold a mounting element on the rail, and a cover device for covering the rail. The cover device has several planar cover elements arranged in continuous series extending along the rail, wherein the cover elements are each mounted so as to be pivotable between a closed state in which the respective cover element lies on the rail and an open state in which the respective cover element is removed from the rail. The fixing element has an engagement element which is configured, on displacement of the fixing element along the rail, to reach below a cover element and move the cover element from the closed state to the open state.

13 Claims, 5 Drawing Sheets

(51) Int. Cl.
  *B60N 2/07* (2006.01)
  *B62D 27/02* (2006.01)
  *B60N 2/015* (2006.01)

(56) References Cited

U.S. PATENT DOCUMENTS

| | | | | |
|---|---|---|---|---|
| 4,475,701 | A | * | 10/1984 | Martin .................. B60P 7/0815 |
| | | | | 244/118.6 |
| 4,723,732 | A | * | 2/1988 | Gorges ............... B64D 11/0696 |
| | | | | 104/165 |
| 4,771,969 | A | * | 9/1988 | Dowd ................ B64D 11/0696 |
| | | | | 244/118.6 |
| 4,796,837 | A | * | 1/1989 | Dowd ................ B64D 11/0696 |
| | | | | 244/122 R |
| 4,936,527 | A | * | 6/1990 | Gorges ..................... B64C 1/20 |
| | | | | 104/165 |
| 5,529,378 | A | * | 6/1996 | Chaban ............. B60N 2/01508 |
| | | | | 297/331 |
| 5,800,015 | A | * | 9/1998 | Tsuchiya ............. B60N 2/0715 |
| | | | | 248/430 |
| 6,086,018 | A | * | 7/2000 | Gobeil ................... B60N 2/015 |
| | | | | 244/122 R |
| 7,399,149 | B2 | | 7/2008 | Kinoshita et al. |
| 7,726,730 | B2 | | 6/2010 | Peter et al. |
| 7,900,990 | B2 | * | 3/2011 | Townson .............. B60P 7/0815 |
| | | | | 296/100.16 |
| 9,522,614 | B2 | | 12/2016 | Clark et al. |
| 9,592,903 | B2 | * | 3/2017 | Wottke ................... B64D 11/06 |
| 9,656,753 | B2 | | 5/2017 | Schomacker et al. |
| 10,220,731 | B2 | * | 3/2019 | Kume .................. B60N 2/0722 |
| 2007/0175147 | A1 | * | 8/2007 | Fiedler ................. E04F 19/066 |
| | | | | 52/466 |
| 2011/0309195 | A1 | * | 12/2011 | Bishop ..................... B64C 1/20 |
| | | | | 244/118.6 |
| 2014/0349042 | A1 | * | 11/2014 | Schomacker ...... B60N 2/01575 |
| | | | | 428/34.1 |
| 2017/0341754 | A1 | * | 11/2017 | Gross ................ B64D 11/0639 |
| 2017/0341756 | A1 | * | 11/2017 | Fuerstenberg ..... B64D 11/0639 |
| 2018/0222593 | A1 | * | 8/2018 | Gross .................... B60N 2/015 |
| 2018/0251046 | A1 | * | 9/2018 | Sugimoto .............. B60N 2/085 |

FOREIGN PATENT DOCUMENTS

| | | |
|---|---|---|
| CN | 105882459 A | 8/2016 |
| DE | 102009004987 B4 | 7/2010 |
| DE | 102012108982 A1 | 3/2014 |
| DE | 102013103662 A1 | 10/2014 |
| JP | 2005112319 A | 4/2005 |
| JP | 2015217733 A | 12/2015 |

* cited by examiner

RAIL SYSTEM FOR A CABIN OF A VEHICLE

CROSS-REFERENCES TO RELATED APPLICATIONS

This application claims the benefit of the German patent application No. 10 2018 108 304.1 filed on Apr. 9, 2018, the entire disclosures of which are incorporated herein by way of reference.

FIELD OF THE INVENTION

The invention concerns a rail system for a cabin of a vehicle, a passenger seat system for a cabin of a vehicle, and a vehicle with a cabin and a passenger seat system arranged therein.

BACKGROUND OF THE INVENTION

Often, in vehicles used for transport of passengers, floor rails are used for fixing passenger seats and other devices in variable positions. The floor rails may have fixing means which are arranged in a specific matrix. The matrix allows different fixing positions on the floor rails to be achieved. The object concerned is usually fixed in a desired position by a locking device which performs a form-fit and/or force-fit locking with fixing means on the floor rails.

It is also known, in particular in aircraft, to be able to determine—as desired or temporarily necessary—a spacing between successive seats in a longitudinal direction, and in some cases to change this spacing occasionally or regularly. For this, the locking devices of the seats concerned are released, then the seats are moved along the floor rails and the locking devices are locked again. Changing the spacing, in particular between two passenger seats arranged behind each other, may change the seating class of the respective portion of the passenger cabin. It is known to use sliding guides with guide rails for easier movability.

DE 10 2009 004 987 B4 discloses a sliding seat for a transport means, with a seat frame for movably attaching to a carrier structure of the transport means, wherein the seat is configured such that two seats arranged behind each other in the transport means have a smaller common floor area in a collapsed and at least partially nested storage state than in an expanded usage state.

DE 10 2013 103 662 A1 describes a holding device for fixing passenger seats in a transport means, which has a seat leg fixing element, a sliding element and a rail element.

SUMMARY OF THE INVENTION

For use of the guide rails described above, normally covers are required which must be adapted to the respective position of the passenger seats mounted on the guide rails. The adaptation may be made by the displacement movement of the passenger seat concerned or by manual interaction by a user.

It is an object of the invention to propose a rail system for a cabin of a vehicle in which an adapted covering of a guide rail can be achieved as easily as possible and, in particular, without manual interaction by a user.

A rail system is proposed for a cabin of the vehicle, comprising a rail with a main extension direction, a fixing element which can be fixed at various positions of the rail to hold a mounting element on the rail, and a cover device for covering the guide rail. The cover device has several planar cover elements arranged in continuous series extending along the rail, wherein the cover elements are each mounted so as to be pivotable between a closed state, in which the respective cover element lies on the rail, and an open state, in which the respective cover element is removed from the rail, and wherein the fixing element has an engagement element which is configured, on displacement of the fixing element along the rail, to reach below a cover element and move this from the closed state to the open state.

The rail is an elongate component which can be arranged on or in the floor of the cabin concerned. As outlined above, such a rail may, in particular, be a floor rail. The rail is configured to form a connection with a fixing element at various positions, which are arranged, for example, in a matrix along the rail. The matrix could take the form of catch openings arranged along the main extension direction equidistantly from each other. In commercial aircraft, it is usual to connect such rails directly to the structure of the aircraft because of the considerable loads to be supported.

The fixing element is intended to create a form-fit and/or force-fit connection to the rail. For this, proven devices may be used which depend on the design of the rail. If the rail is configured as a floor rail, the devices may have mushroom-shaped locking bodies which can be introduced through catch openings into a cavity of the rail, and from the cavity, be secured with protrusions between successive catch openings.

The rail may however also be a rail which is modified or supplemented to provide an improved sliding guide. The fixing elements are adapted to this and have a structure dependent on the rail. They may, consequently, deviate from fixing elements which are used for fixing to a conventional floor rail or seat rail.

One feature of the rail system according to the invention is the use of the cover device which is configured in the form of several cover elements in continuous series. Their pivotable arrangement allows each cover element either to completely cover or completely release a respective portion of the rail. The individual cover elements thus form a segmented strip-like cover device which is preferably arranged along the entire rail. An engagement element of the fixing element is designed so that, without manual interaction, on movement of the fixing element with the cover elements along the rail, it reaches below a cover element and releases this from its closed state.

The advantage of this design lies in the particularly simple operation of the cover device, since directly during the process of moving a fixing element, only the respective part of the cover device which is situated at the momentary position of the fixing element is opened from the closed state. If a structural element, for example a passenger seat, is connected to one or more fixing elements which are arranged on the rail, on movement of the seat along the rail, the cover element at the target position can automatically be opened, wherein all cover elements previously passed are closed again. This firstly increases the user-friendliness, since a user need not concern himself with covering the rail. Secondly, the rail is reliably protected from soiling or possible damage.

In an advantageous embodiment, the rail is a guide rail, wherein the fixing element is a slide with a longitudinal axis which is configured to be guided on the rail with its longitudinal axis parallel to the main extension direction, and wherein the fixing element has, as an engagement element, at least one ramp portion which is wedge-shaped along the longitudinal axis and tapers towards the outside along the longitudinal axis. In the sense of the invention, a guide rail is an elongate component which may be connected directly to the structure supporting the floor. Alternatively, a guide rail may also be connected to floor rails which are connected to the structure supporting the floor. In the latter case, a guide rail may also be fitted to a vehicle after its construction, in that existing floor rails are equipped therewith. The guide rails are intended to guide the slide in a predefined movement direction as smoothly as possible without tilting, and to absorb all loads associated with passenger seats carried by the slide and transfer these to the structure of the vehicle concerned. The ramp portion provides a flat edge close to the rail which is pushed below a corresponding cover element in order for the ramp to slowly raise the cover element on movement of the slide, i.e., lift it further from the rail.

Particularly preferably, the ramp portion has a substantially round bottom face. The bottom face may, in particular, be configured as a circle segment, for example, a semicircle. The bottom face may also be partially oval. This gives a widening wedge which leads to a smooth pivot movement.

Preferably, each cover element is linked to a spring mechanism which forces the cover element into the closed state. The spring mechanism is preferably arranged on a side of the cover device facing the rail, so that, in particular, in a closed state, the rail is not visible and is protected from possible mechanical damage. In a particularly simple case, the spring mechanism may include only one or several tension springs extending between a respective cover element and a structurally fixed part. The structurally fixed part may be part of the cover device which carries a hinge and is connected to a floor or part of the rail. The spring mechanism need not exert particularly high forces for holding a cover element closed. In the design of the spring mechanism, it is important that a simple pivoting of a respective cover element is possible by moving the fixing element, so as to guarantee the actual function according to the invention. Secondly, the spring mechanism must provide a sufficiently high force to avoid vibration-induced rattling as far as possible, in particular in the closed state.

Preferably, the cover elements each have two delimiting edges which are arranged transversely to the main extension direction of the rail and which, in the closed state, at least partially form a vertical distance from the rail. Thus a defined space may be provided which is filled by the engagement element before the respective cover element is pivoted open. It is preferred that in the closed state, the cover element is arranged parallel to the rail or the floor of the cabin. It is also conceivable that, with a segmented design of the cover element, i.e., division into two cover elements, an edge situated above the rail is supported by a capping element on the rail.

In a preferred embodiment, two cover elements arranged next to each other transversely to the main extension direction form a respective cover unit, wherein the cover elements each have a hinge at an outer edge facing away from the other cover element and parallel to the rail so that they pivot open in opposite directions, and each have an inner edge opposite the outer edge and parallel to the rail so that the inner edges of a cover unit point towards each other in the closed state. Therefore a succession of cover units is arranged over the rail in the manner of a double-leaf door. The distance covered on a respective opening movement of an individual one of the two cover elements is therefore very small in comparison with a single cover element, so that the risk of possible tilting on passage of the fixing element is minimized.

The spring mechanism may be arranged directly inside or directly on a hinge. The spring mechanism may be configured as a leg spring (as in a clothes peg) or as a torsion bar, and be arranged directly between the respective cover element and a structurally fixed part.

In a particularly advantageous embodiment, the cover device has at least one transitional region arranged laterally on the outside and curved at least in regions about an axis running parallel to the main extension axis, which transitional region compensates for a height difference between a floor and the cover element. Because of the application of a cover element with a certain thickness, when a rail is fitted flush to the floor, there is a height difference from the surrounding floor. To avoid an edge, integration of the transitional region is useful. This may have a certain curvature which leads to a very smooth transition between the floor level and the top of a cover element. This is particularly advantageous if an additional vertical distance is provided between the cover element and the rail. Particularly preferably, such a transition element is arranged on each side of the cover device.

The rail system may furthermore comprise at least one flexible capping element which is arranged on the cover device as protection from mechanical damage. The flexible element could be implemented in the form of a fabric web which is laid, pushed or glued directly onto the cover device. In particular, when the cover device is produced with a hinge extending on one side of the rail, this prevents the penetration of dirt into the hinge. Also, a harmonious appearance is achieved which can be improved, in particular, by use of a fabric of the same or similar color as the surrounding carpet.

The capping element may be segmented into two portions which have two inner edges facing each other and arranged offset relative to the inner edges of the cover elements of the cover unit in a direction transverse to the main extension axis of the rail, so that in the closed state, the inner edges of the cover elements are overlapped by the capping element. The at least one capping element could consequently also be produced in the form of two flexible capping elements. If a cover device is designed as a double-leaf door, additionally a butt joint or gap between the cover elements can thus be covered so that, in particular, liquids and other dirt cannot reach the rail.

The invention furthermore concerns a passenger seat system for a cabin of a vehicle, comprising at least one passenger seat device with a seat frame and a rail system as described above, wherein the rail system has two rails spaced apart from and running parallel to each other, wherein the seat frame of the at least one passenger seat device has two pairs of seat legs spaced apart from each other and each connected to a fixing element, and wherein the fixing elements are in engagement with the rails. As explained above, the rail may be produced, in particular, as a guide rail and the fixing element as a slide which can be moved along the guide rail.

In the passenger seat system, as already mentioned above, rails in the form of guide rails may be attached to seat rails arranged in a floor of a cabin of the vehicle. This allows a simple aftermarket solution.

Finally, the invention concerns a vehicle with a cabin, a cabin floor and at least one such passenger seat system.

Preferably, the vehicle is an aircraft, in particular, a commercial aircraft.

BRIEF DESCRIPTION OF THE DRAWINGS

Further features, advantages and possible applications of the present invention arise from the following description of the exemplary embodiments and the figures. All features described and/or shown in the figures form the subject of the invention, either alone and in any combination, also independently of their summary in the individual claims or their back references. In the figures, the same reference signs are used for the same and similar objects.

DETAILED DESCRIPTION OF THE PREFERRED EMBODIMENTS

Figure 1:
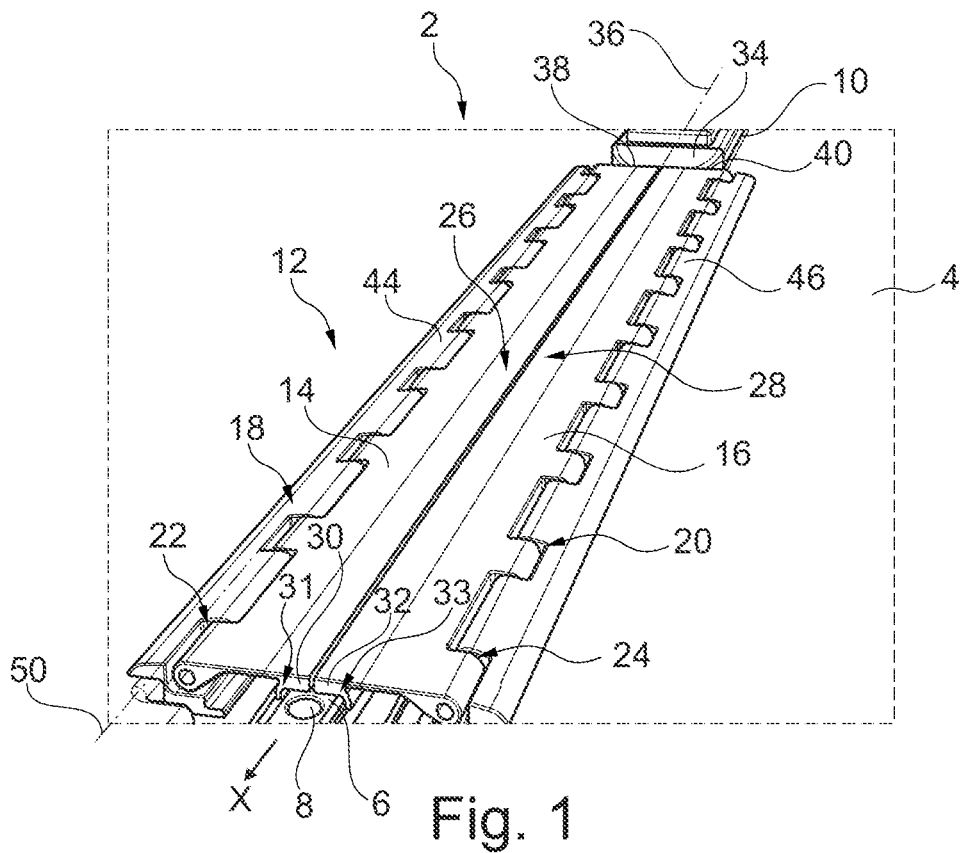
FIG. 1 shows a rail system in a three-dimensional view.

FIG. 1 shows a rail system 2 which is arranged on a floor 4 of a cabin of the vehicle. The rail system 2 has a rail 6 with a main extension direction x. As an example, the rail 6 is configured as a guide rail which functions as a sliding guide, and several catch openings 8 serve for locking components guided thereon. The rail system 2 furthermore has a fixing element 10, here configured in the form of a slide, which has a recess designed complementarily to a profile cross-section of the rail 6 in order to establish a sliding guide. The recess (not shown) is arranged on the underside, i.e., on a side facing the floor 4, and is in engagement with the rail 6. The fixing element 10 can therefore easily be moved along the rail 6.

In addition, the rail system 2 has a cover device 12, which is here shown as an example only by means of a partial portion. The cover device here is distinguished by two planar cover elements 14 and 16 which are each mounted pivotably via a hinge 18 and 20. In the embodiment shown, the cover device 12 consequently has a structure similar to that of a double-leaf door. A leg spring or other spring mechanism (not shown) may be integrated in the hinges 18 and 20 and always forces the cover elements into the closed state.

Two outer edges 22 and 24 are fixedly mounted, while two inner edges 26 and 28 spaced from the outer edges 22 and 24 may assume a variable distance from the rail 6. In FIG. 1, the cover device 12 is in a closed state in which the inner edges 26 and 28 have the smallest possible distance from the rail 6, so that this is completely covered.

Capping elements 30 and 32 are arranged on the sides of the inner edges 26 and 28 facing the rail 6; these rest on the rail 6 and create a defined distance of the inner edges 26 and 28 from the rail 6. The capping elements, for example, each have a shoulder 31 and 33, giving an approximate L shape which can be brought into superficial contact with the corresponding outer edge of the rail 6. The rail 6 is consequently spanned by the two capping elements 30 and 32 in the manner of pincers. As a whole, the orientation of the cover elements 14 and 16 in the closed state is parallel to the surrounding floor 4.

Figure 2:
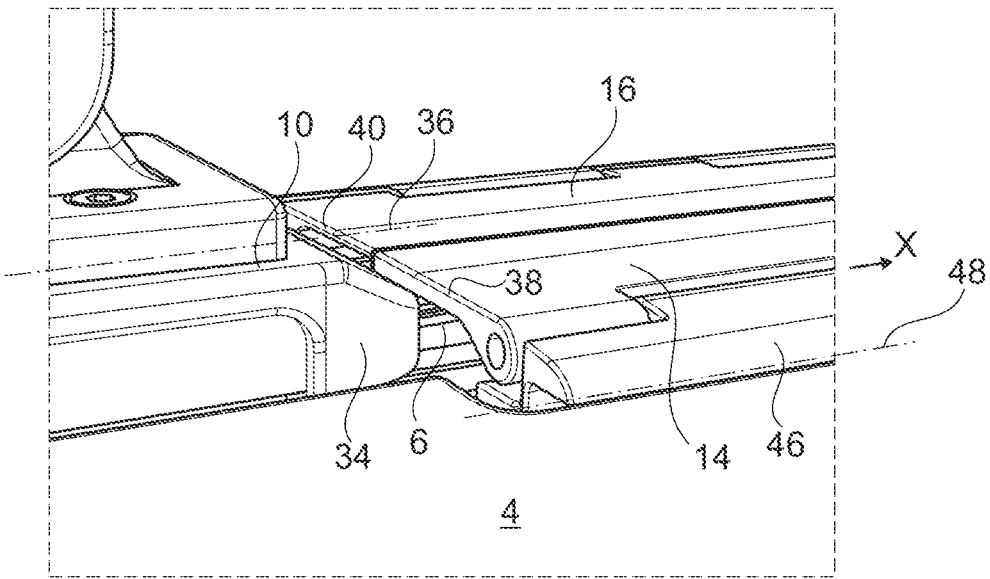
FIG. 2 shows a detail of a fixing element and a cover device of the rail system.

As evident in outline in FIG. 1 and shown in more detail in FIG. 2, the fixing element 10 has a ramp portion 34 as an engagement element which runs approximately in a wedge shape along a longitudinal axis 36 of the fixing element 10. A height of the fixing element 10 is consequently smaller at an outer end of the ramp portion 34 than at an inner end. FIG. 2 shows a position of the fixing element 10 in which the ramp portion 34 just touches the two adjacent cover elements 14 and 16 at their mutually aligned delimitation edges 38 and 40 which run transversely to the main extension direction x. Because of the vertical distance of the delimitation edges 38 and 40 from the rail 6, the ramp portion 34 can accordingly slide below the delimitation edges 38 and 40.

The ramp portion 34 as a whole is round or rounded in several directions. A bottom face of the ramp portion 34 above the floor 4 is approximately semicircular. All delimitation edges of the ramp portion 34 are rounded. When the ramp portion 34 slides under the delimitation edges 38 and 40, consequently initially a contact exists at two contact points which lie close to the inner edges 26 and 28. When the fixing element 10 slides further beneath the cover elements 14 and 16, these contact points move further outward while the cover elements 14 and 16 are pivoted upward.

Figure 3:
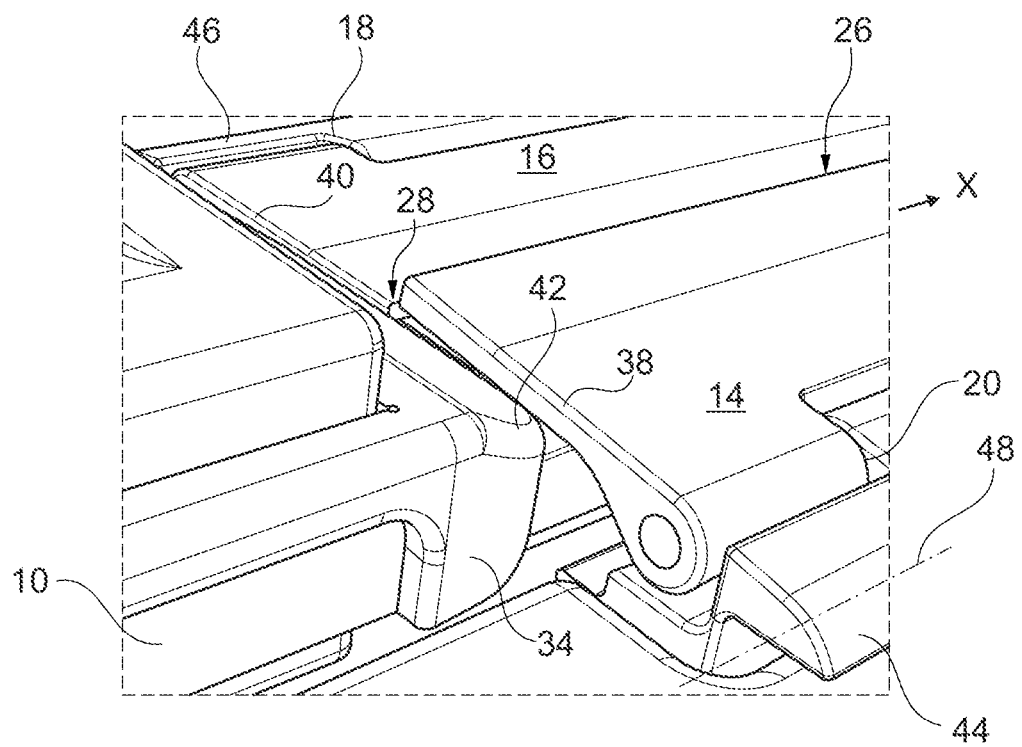
FIG. 3 to FIG. 7 show the process of sliding a fixing element on the rail for automatic opening of a cover device.

FIG. 3 shows the fixing element 10 in a position further beneath the cover elements 14 and 16. An outer contour 42 of the ramp portion 34 leads to a gradual pivoting movement of the inner edges 26 and 28 of the cover elements 14 and 16. This is shown further in successive stages in FIGS. 4, 5, 6 and 7.

A height difference between a level of the floor 4 and a top of the cover elements 14 and 16 is compensated by laterally arranged transitional regions 44 and 46. The transitional regions 44 and 46 are curved so there are no sharp outer edges which could constitute a trip hazard. The curvature may be around at least one axis 48 or 50 which is parallel to the main extension direction x of the rail 6. Further axes determining the curvature are conceivable. The curvature may be continuous and have a direction change so as to give a harmonious transition to the floor 4.

Figure 4:
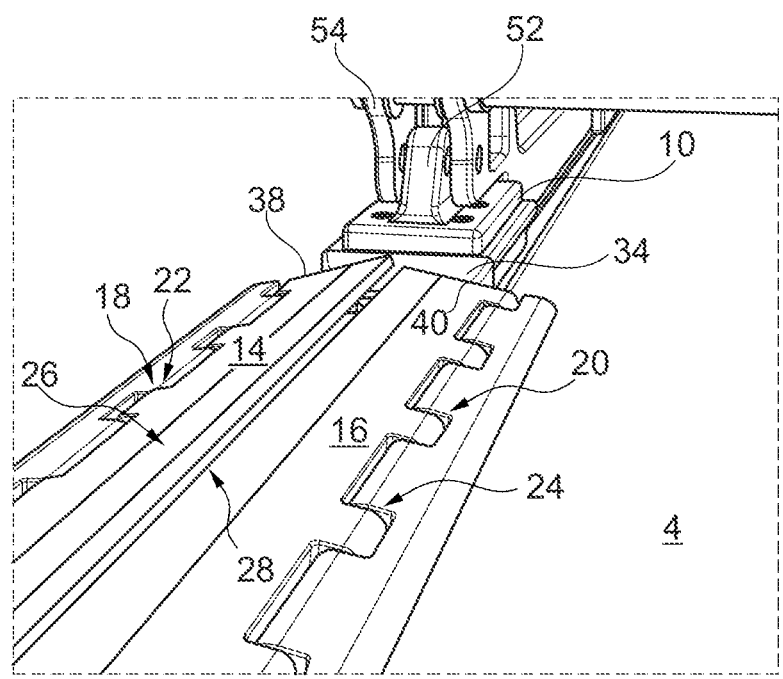

FIG. 4 shows from a spatial perspective that, for example, a flange 52 is arranged on a top side of the fixing element 10 and carries a mounting element 54. This is, for example, a seat frame or part thereof. On movement of the fixing element 10 in the extension direction x of the rail 6, the shape of the element opens the cover device 12 so that the fixing element 10 can be attached at underlying positions of the rail 6, and so that a desired position of the flange 52 can be achieved. At the same time, regions of the rail 6 which have already been passed or are further away are automatically closed by a respective cover device 12.

Figure 5:
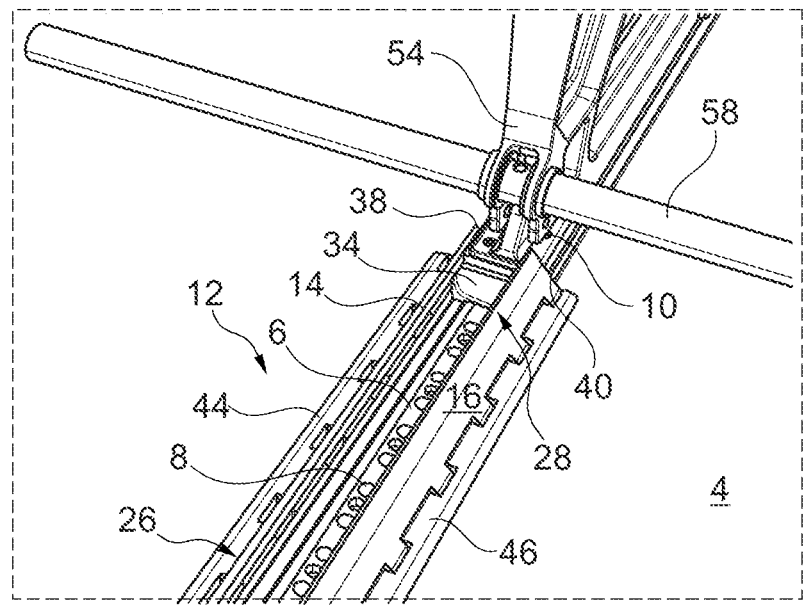
Figure 6:
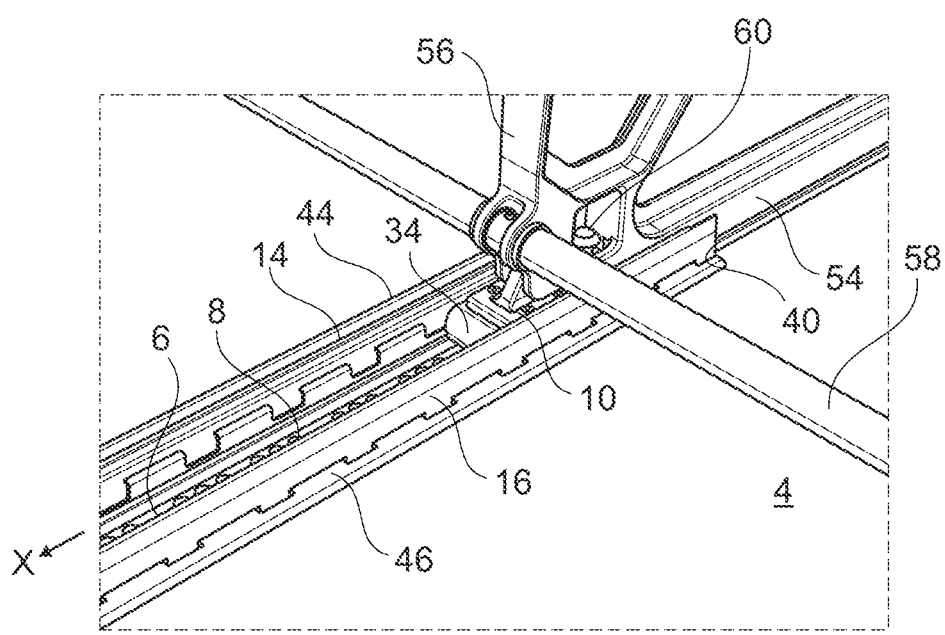
Figure 7:
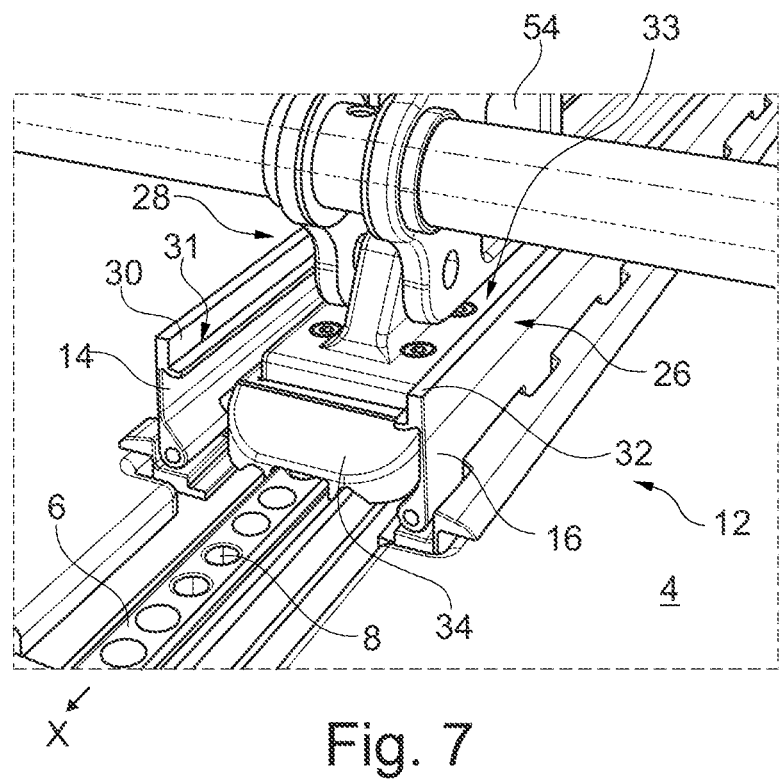

FIG. 5 shows an opening degree of the cover device 12 which allows complete passage of the fixing element 10 and mounting element 54 arranged thereon. FIG. 6 also shows in a successive stage that, due to the open state of the cover device 12, the mounting element 54 need not necessarily be arranged vertically above the fixing element 10, but may also pass directly behind the fixing element 10 through the gap between the cover elements 14 and 16. FIG. 7 shows, following this, a completely opened cover device 12 with the space between the two cover elements 14 and 16 completely filled by the corresponding mounting element 54.

For the sake of completeness, it is stated that the mounting element 54 is a seat frame with a front seat leg 56 and the rear seat leg (not shown), depicted with a baggage bar 58. This serves to limit how far forward hand baggage can be pushed below a passenger seat. In the open state, the cover elements 14 and 16 allow the baggage item to be guided along the rail at a distance.

A locking device 60 can also be seen, which is configured to lock the fixing element 10 to the rail 6 by catch openings 8. The arrangement and configuration of such a locking device may be also selected completely differently.

Figure 8:
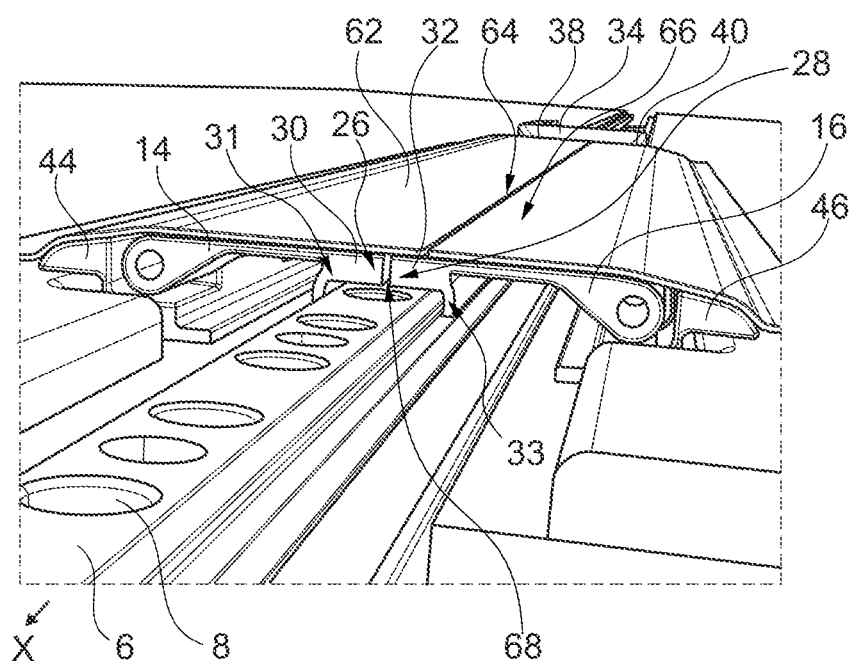
FIGS. 8 and 9 show the rail system with a flexible capping element on the cover elements.
Figure 9:
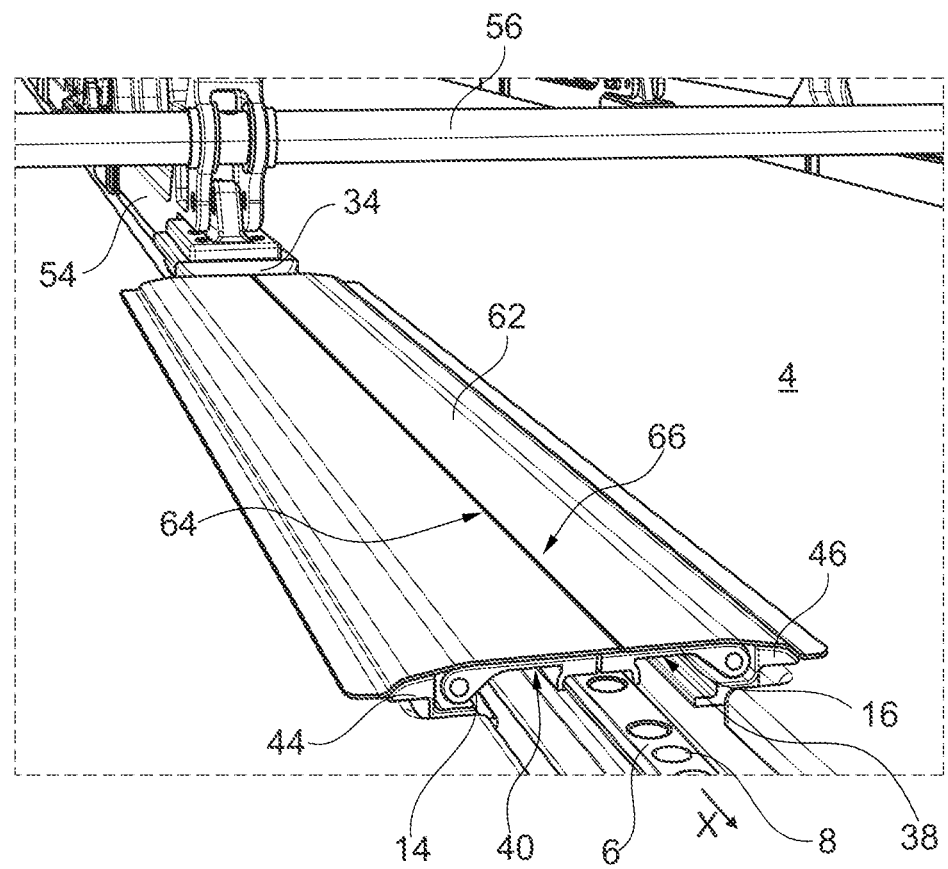

FIG. 8 shows a capping element 62 which comprises a flexible material. With this, the top of the entire cover device 12 can be covered so as to give a harmonious visual appearance and, in particular, protect the hinges 18 and 20 from dirt. It is furthermore evident that the capping element 62 is segmented into two portions having two inner edges 64 and 66 which face each other but are offset relative to the inner edges 26 and 28 of the cover elements 14 and 16. Consequently, a gap 68 between the inner edges 26 and 28 of the cover elements 14 and 16 is covered. The capping element 62 may, for example, be made from an elastomer. As shown in FIG. 9, a good covering of the rail 6 can be achieved which is robust and requires practically no manual interaction on the movement of passenger seats or other fitting elements.

Figure 10:
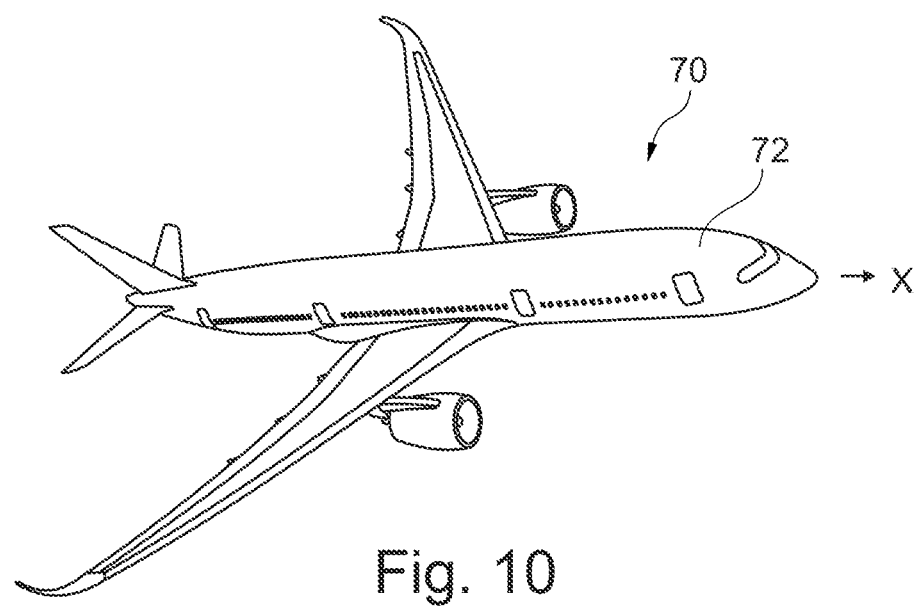
FIG. 10 shows an aircraft with a cabin and a rail system installed therein.

FIG. 10 finally shows an aircraft 70 with cabin 72 arranged therein which is equipped with a rail system 2.

In addition, it is pointed out that the term "comprising" does not exclude other elements or steps, and the terms "one" or "a" do not exclude a plurality. It is furthermore pointed out that features described with reference to one of the above exemplary embodiments may also be applied in combination with other features from other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rail system for a cabin of a vehicle, comprising
   a rail with a main extension direction,
   a fixing element which is fixable at various positions of the rail to hold a mounting element on the rail, and
   a cover device to cover the rail,
   wherein the cover device has several planar cover elements arranged in a continuous series extending along the rail,
   wherein the cover elements are each mounted so as to be pivotable between a closed state in which the respective cover element lies on the rail and an open state in which the respective cover element is removed from the rail, and
   wherein the fixing element has an engagement element which is configured, on displacement of the fixing element along the rail, to reach below a cover element and move the cover element from the closed state to the open state.

2. The rail system according to claim 1,
   wherein the rail is a guide rail,
   wherein the fixing element is a slide with a longitudinal axis which is configured to be guided on the rail with a longitudinal axis parallel to the main extension direction, and
   wherein as an engagement element, the fixing element has at least one ramp portion which is wedge-shaped along the longitudinal axis and tapers towards an outside along the longitudinal axis.

3. The rail system according to claim 2, wherein the ramp portion has a substantially round bottom face.

4. The rail system according to claim 1, wherein each cover element is linked to a spring mechanism which forces the cover element into the closed state.

5. The rail system according to claim 1, wherein the cover elements each have two delimiting edges which are arranged transversely to the main extension direction of the rail and which, in the closed state, at least partially form a vertical distance from the rail.

6. The rail system according to claim 1,
   wherein two cover elements arranged next to each other transversely to the main extension direction form a respective cover unit, and
   wherein the cover elements each have a hinge at an outer edge facing away from the other cover element and parallel to the rail so that they pivot open in opposite directions, and each have an inner edge opposite the outer edge and parallel to the rail, so that the inner edges of a cover unit point towards each other in the closed state.

7. The rail system according to claim 1, wherein the cover device has at least one transitional region arranged laterally on the outside and curved at least in regions about an axis running parallel to an extension of the main extension, which transitional region compensates for a height difference between a floor and the cover elements.

8. The rail system according to claim 1, furthermore comprising at least one flexible capping element arranged on the cover device as protection from mechanical damage.

9. The rail system according to claim 8,
   wherein two cover elements arranged next to each other transversely to the main extension direction form a respective cover unit,
   wherein the cover elements each have a hinge at an outer edge facing away from the other cover element and parallel to the rail so that they pivot open in opposite directions, and each have an inner edge opposite the outer edge and parallel to the rail, so that the inner edges of a cover unit point towards each other in the closed state, and
   wherein the capping element is segmented into two portions which have two inner edges facing each other and arranged offset relative to the inner edges of the cover elements of the cover unit in a direction transverse to an axis of the main extension of the rail, so that the inner edges of the cover elements are overlapped by the capping element in the closed state.

10. A passenger seat system for a cabin of a vehicle, comprising:
    at least one passenger seat device with a seat frame, and
    a rail system according to claim 1,
    wherein the rail system has two rails spaced apart from and running parallel to each other,
    wherein the seat frame of the at least one passenger seat device has two pairs of seat legs spaced apart from each other and each connected to a fixing element, and
    wherein the fixing elements are in engagement with the rails.

11. A vehicle with a cabin, a cabin floor and at least one passenger seat system according to claim 10.

12. The vehicle according to claim 11, wherein the vehicle is an aircraft.

13. The vehicle according to claim 12, wherein the aircraft is a commercial aircraft.

* * * * *